C. P. COON.
GRAIN DOOR.
APPLICATION FILED FEB. 4, 1911.
1,019,025.
Patented Mar. 5, 1912.
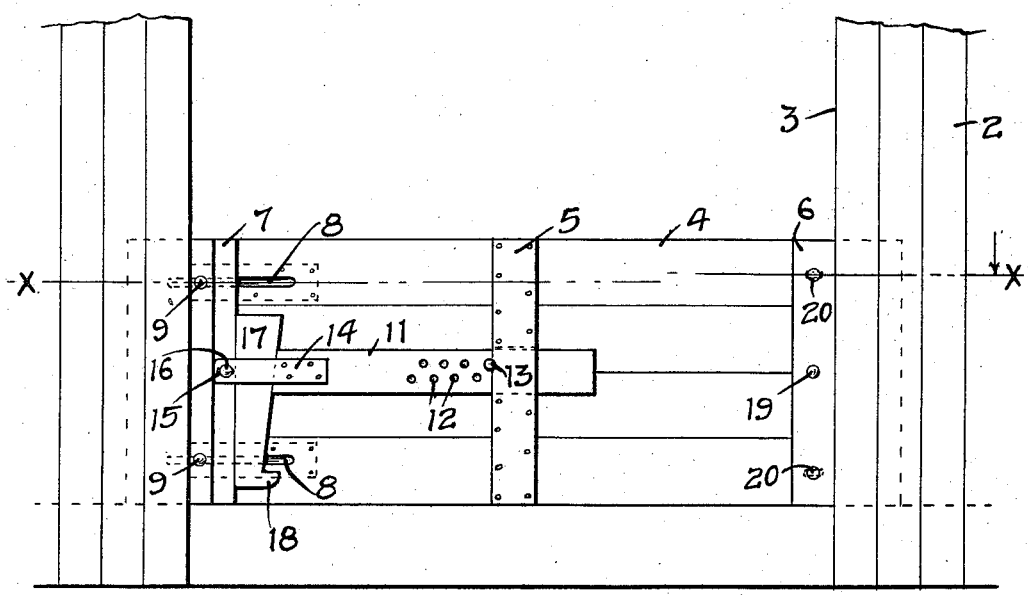
Fig 1.
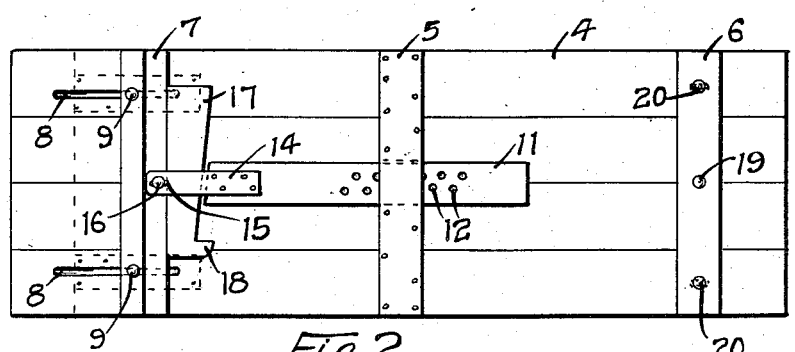
Fig 2.
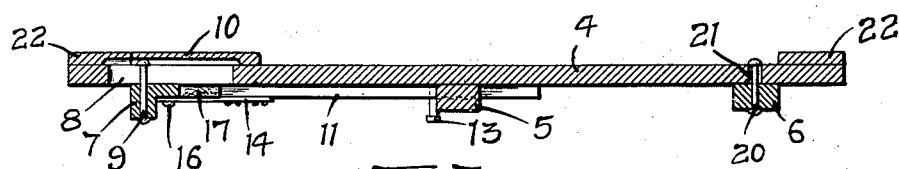
Fig 3. x-x
WITNESSES
MMWahlstrom
E. A. Paul
INVENTOR
CALVIN P. COON
By Paul & Paul
ATTORNEYS

UNITED STATES PATENT OFFICE.

CALVIN P. COON, OF BRUCE, WISCONSIN.

GRAIN-DOOR.

1,019,025.  Specification of Letters Patent. Patented Mar. 5, 1912.

Application filed February 4, 1911. Serial No. 606,623.

*To all whom it may concern:*

Be it known that I, CALVIN P. COON, of Bruce, Rush county, Wisconsin, have invented certain new and useful Improvements in Grain-Doors, of which the following is a specification.

My invention relates to grain doors for freight cars and the object of the invention is to provide a door which can be easily and quickly applied to any style of car or size of door opening and will readily adapt itself to any variation in width of the door opening due to the warping or twisting of the door frame or the excessive loading of the car.

A further object is to provide a door that is readily removable from the car so that the car can be used for other purposes than hauling grain.

Other objects of the invention will appear from the following detailed description.

The invention consists generally in various constructions and combination, all as hereinafter described and particularly pointed out in the claims.

In the accompanying drawings forming part of this specification, Figure 1 is an outside view of a car illustrating my invention in place in the door-way, Fig. 2 is a front view of a door removed from the car, Fig. 3 is a longitudinal sectional view of the same on the line $x$—$x$ of Fig. 1.

In the drawing, 2 represents the side wall of the car and 3 the door frame.

The grain door is composed of boards 4 placed edge to edge and cleats 5, 6 and 7. The cleat 7 is slidable lengthwise of the door by means of slots 8 running lengthwise of the door and bolts 9 passing through the cleat and through said slots. The slots and bolts are protected on the inside of the door by a guard plate 10.

11 is a sliding bar adapted to move back and forth in the cleat 5 and having a series of holes 12 adapted to receive a pin 13. The holes are arranged at intervals in the sliding bar to allow its lengthwise adjustment and the pin locks the sliding bar against longitudinal movement in one direction. A strap 14 connects the sliding bar 11 with the cleat 7 and said strap preferably has a slot 15 therein in which a pin 16 on the cleat has a limited movement. A wedge 17 is interposed between the end of the sliding bar and the cleat 7 and when it is forced down to its locking position the cleat is pressed against the door frame and holds the door securely in place therein. The end of the sliding bar is preferably beveled to fit the edge of the wedge and a projection 18 is preferably formed on the lower end of the wedge to prevent it from becoming separated from the door. The connections of the cleat 7 with the door and with the strap 14 allow the cleat to rock slightly and seat itself evenly and firmly against the door frame, even though the frame may be warped or twisted out of its normal vertical position. At the opposite end of the door the cleat 6 has a central pivot 19 and pins 20 fitting within transverse slots 21 in the ends of the door, these slots allowing sufficient oscillation of the cleat so that it will seat itself against the door frame. Cross pieces 22 are preferably provided on the inside of the door 6 for the purpose of holding the ends of the boards composing the door securely together.

In using the door the sliding bar is adjusted to adapt the cleats approximately to the width of the door opening and the door is then put in place in the opening and the wedge 17 forced downwardly until the cleats 6 and 7 are clamped securely against the door frame. In unloading the car the wedge 17 is raised by any suitable means and the clamping cleats will then be released, allowing the door to be lifted.

I claim as my invention:—

1. A grain door adapted to fit against the door frame on the inside of the car and having cleats adapted to engage the door frame, a slide connected with one of said cleats and relatively movable with respect thereto and having means for locking it against movement in one direction, and means for forcing said slide and one of said cleats apart, for the purpose specified.

2. A grain door adapted to fit the inside of a car and having longitudinal slots therein at one end, a cleat having bolts adapted to slide in said slots, a sliding bar connected with the middle portion of said cleat and having a guide on said door, said slide and cleat being relatively movable, a second cleat adapted to bear against the opposite side of the door frame, means for locking said sliding bar against movement in its guide, and means for forcing said first named cleat and said sliding bar apart.

3. A grain door adapted to fit against the door frame on the inside of a car and having cleats 6 and 7 adapted to engage the door frame, a sliding bar pivotally connected with said cleat 7 and relatively movable with respect thereto and having means for locking it against movement in one direction, and a wedge fitting between said sliding bar and said cleat 7 and operating to clamp both of said cleats against the door frame.

4. A grain door adapted to fit the inside of a car door frame and having cleats arranged to contact with the door frame, one of said cleats being slidably mounted on said door, a sliding bar mounted on said door and having means for locking it against movement in one direction, and a wedge interposed between said sliding bar and said slidable cleat and adapted to clamp said cleats against the door frame.

In witness whereof, I have hereunto set my hand this 26" day of January, 1911.

CALVIN P. COON.

Witnesses:
W. T. PIERPONT,
H. H. HOCKENBROCK.

Copies of this patent may be obtained for five cents each, by addressing the "Commissioner of Patents, Washington, D. C."